Figure 2:
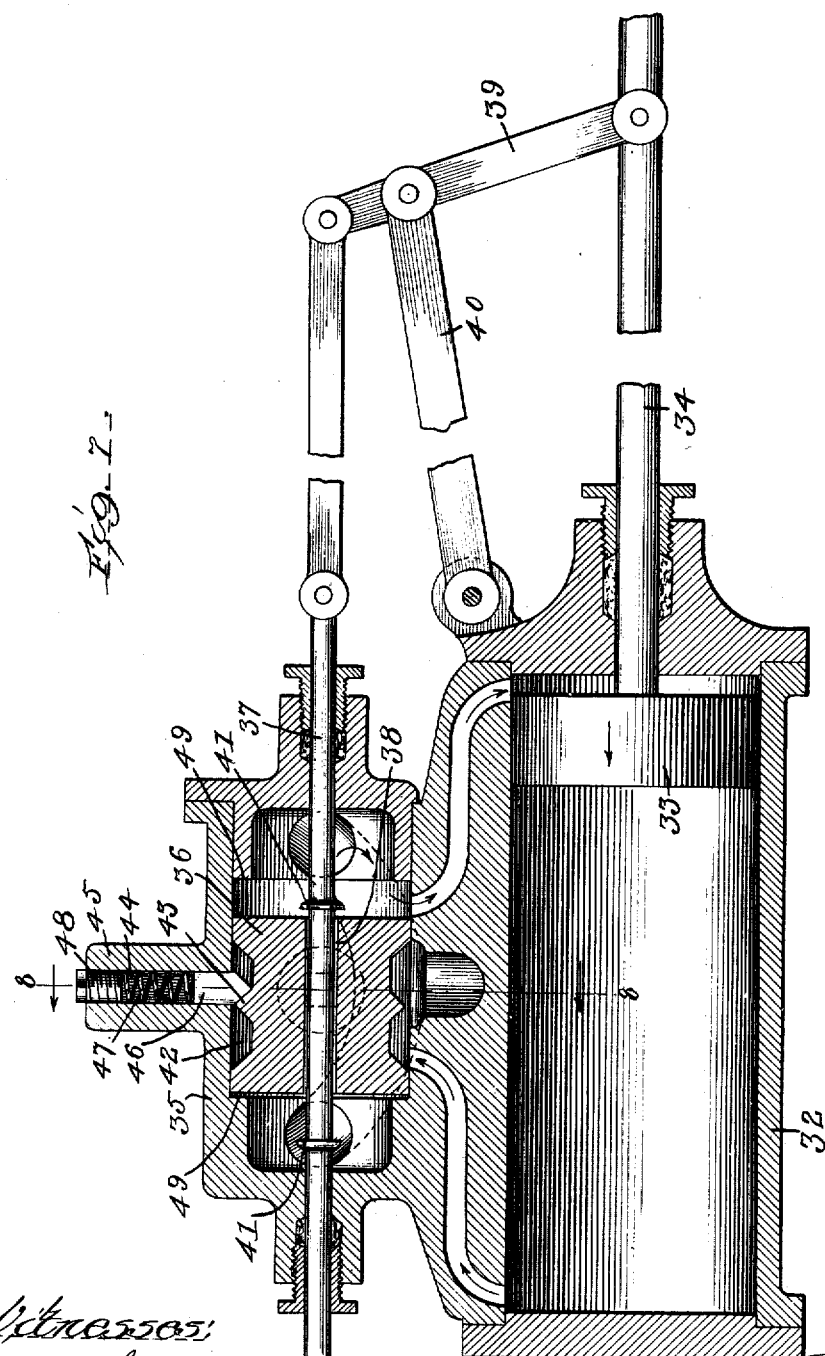

No. 829,504. PATENTED AUG. 28, 1906.
B. B. CARTER.
VALVE.
APPLICATION FILED NOV. 27, 1901.
4 SHEETS—SHEET 1.
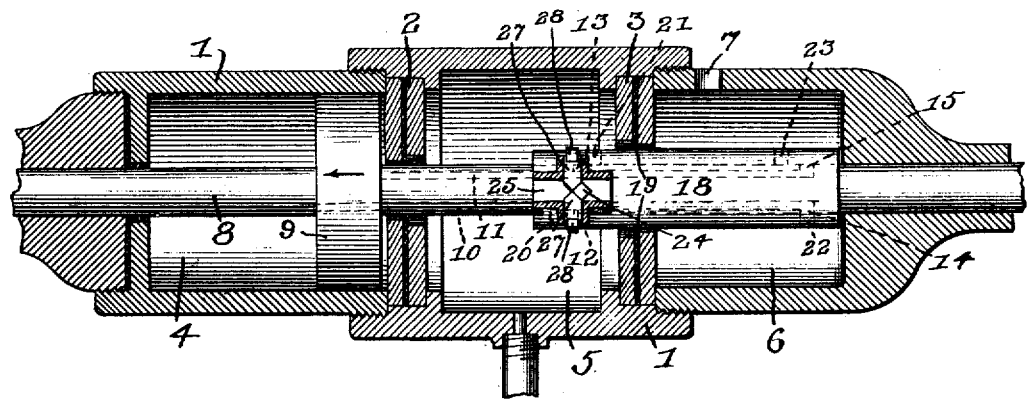
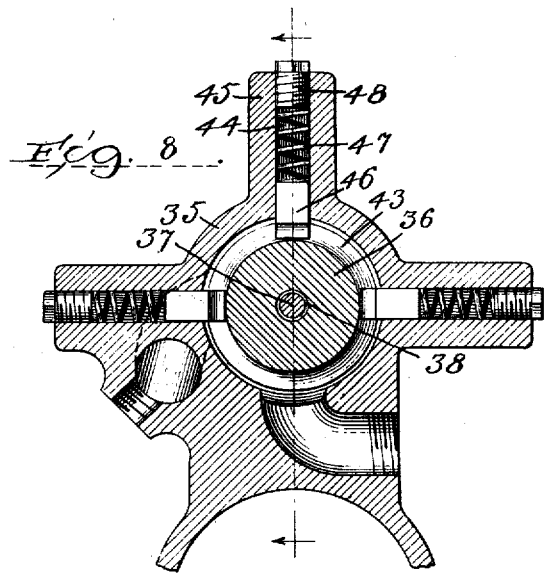
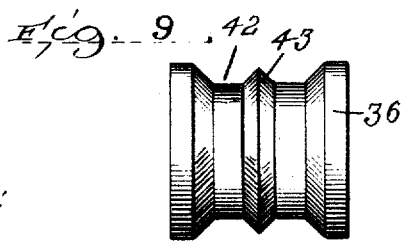
Witnesses:
Ray White
Harry R. White
Inventor:
Byron B. Carter
By Geo. T. Ubaldo,
Attorney.

No. 829,504. PATENTED AUG. 28, 1906.
B. B. CARTER.
VALVE.
APPLICATION FILED NOV. 27, 1901.
4 SHEETS—SHEET 2.
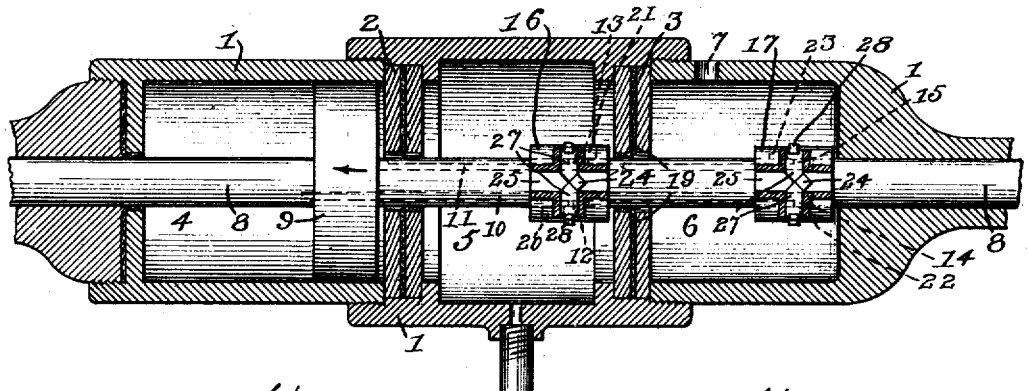
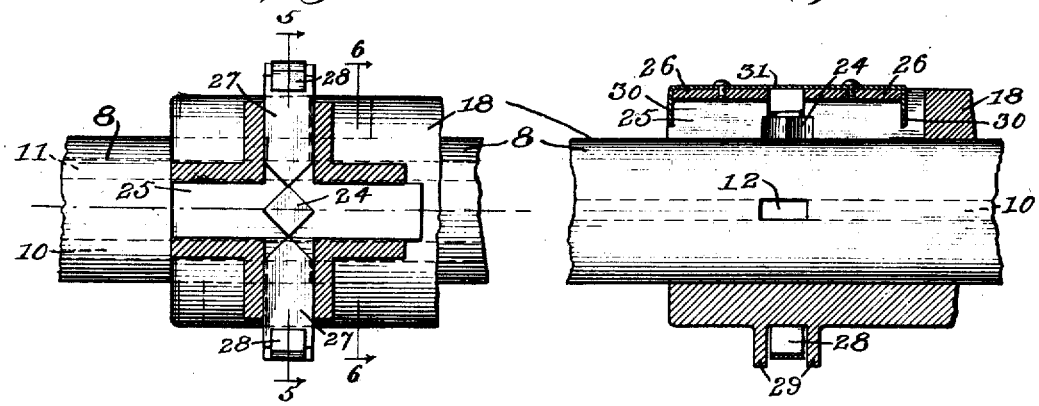
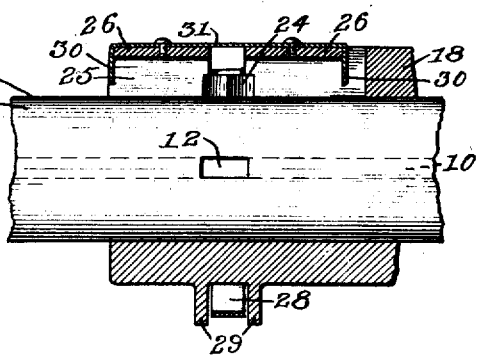
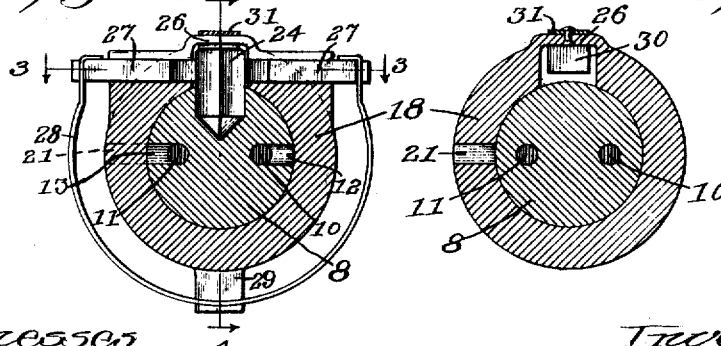
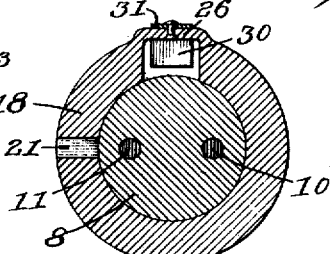

No. 829,504. PATENTED AUG. 28, 1906.
B. B. CARTER.
VALVE.
APPLICATION FILED NOV. 27, 1901.
4 SHEETS—SHEET 3.

Witnesses:
Ray White
Harry C. White

Inventor
Byron B. Carter
By Ino. Ubaldo
Attorney

No. 829,504. PATENTED AUG. 28, 1906.
B. B. CARTER.
VALVE.
APPLICATION FILED NOV. 27, 1901.
4 SHEETS—SHEET 4.
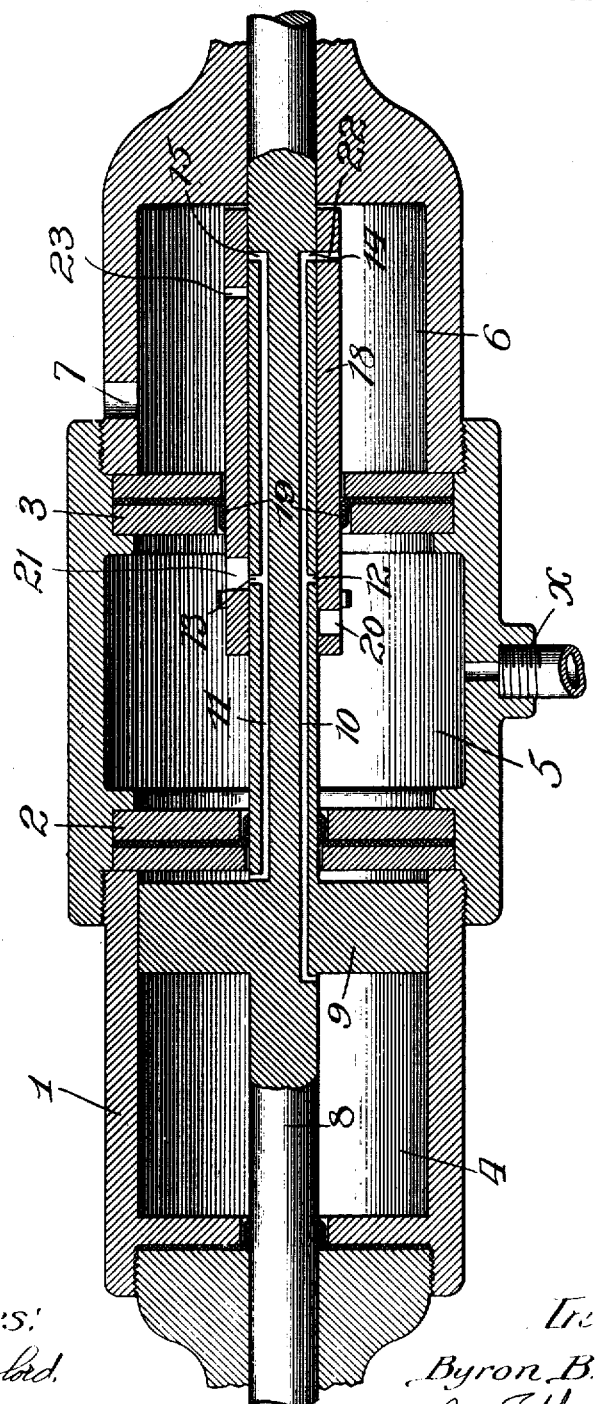

UNITED STATES PATENT OFFICE.

BYRON B. CARTER, OF HINSDALE, ILLINOIS.

VALVE.

No. 829,504.

Specification of Letters Patent.

Patented Aug. 28, 1906.

Application filed November 27, 1901. Serial No. 83,860.

*To all whom it may concern:*

Be it known that I, BYRON B. CARTER, a citizen of the United States, and a resident of Hinsdale, in the county of Du Page and State of Illinois, have invented an Improved Valve, of which the following is a specification.

This invention relates to valves, and relates particularly to valves for impact-engines of the general type heretofore patented to me by Letters Patent of the United States No. 662,763, dated November 27, 1900.

The invention also relates to means for operating or actuating the valves of engines, particularly of the above type, to open and close the admission and exhaust ports of the power cylinder thereof.

As the invention relates to the valve itself the object of the invention is to secure simultaneous movement of the valves, which, as shown in said patent No. 662,763, are independent of each other to insure that the admission and exhaust ports will open and close at the proper relative times.

To effect this object, the invention consists in rigidly connecting said valves, so that movement of either will impart the same movement to the other. As preferably constructed, also, the admission and exhaust ports are controlled by means of a single valve, which extends through the wall separating the valve-chambers and into desired relation to the admission and exhaust ports.

As the invention relates to means for operating a valve, the object of the invention is to provide, in combination with a primary valve-operating mechanism a secondary valve-operating mechanism adapted to supplement the action of the primary valve-operating mechanism to secure a full valve-opening which may be operated with a minimum of power. To effect this object, the invention consists in providing a secondary valve-operating mechanism located within the valve-chamber, and valve connections which will permit the valve to move under the influence of the secondary valve mechanism independently of the primary operating connections.

The invention also consists of the various other features, combinations of features, and details of construction hereinafter described and claimed.

In the accompanying drawings, my invention is fully illustrated.

Figure 1 is a plan section of the casing of an impact-engine, the admission and exhaust ports being controlled by a single valve, said valve being shown partly in section. Fig. 2 is a similar view, the admission and exhaust ports being controlled by separate valves. Fig. 3 is an enlarged sectional plan of said valves on the line 3 3 of Fig. 5. Fig. 4 is a sectional plan on the line 4 4 of Fig. 5. Figs. 5 and 6 are sectional views on the lines 5 5 and 6 6, respectively, of Fig. 3. Fig. 7 illustrates the application of a secondary valve-operating mechanism of my invention to a piston or other form of valve. Fig. 8 is a sectional view on the line 8 8 of Fig. 7. Fig. 9 is a side view of the valve shown in Figs. 7 and 8, and Fig. 10 is a view substantially similar to Fig. 1, showing the valve and piston-rod in section to illustrate the relation of the valve-ports and fluid passages.

Referring now to Figs. 1 to 6, inclusive, and Fig. 10 of the drawings, 1 designates the casing of an impact-engine, the interior of which is divided by walls or partitions 2 and 3 into a power-cylinder 4 and valve-chambers 5 and 6, of which the chamber 5 is connected with a source of supply of fluid under pressure, and the chamber 6 is provided with a discharge-opening 7. 8 is a piston-rod or plunger which extends longitudinally through the casing 1 and is adapted to reciprocate in suitable bearings formed in the ends thereof. 9 is a piston secured to said piston-rod or plunger 8 and fitted to and longitudinally movable in the power-cylinder 4. 10 and 11 are passages formed longitudinally in the piston-rod or plunger 8, which are in open communication with the power-cylinder 4 on opposite sides of the piston 9 and which are respectively provided with admission-ports 12 and 13, which connect said passages with the chamber 5 and with exhaust-ports 14 and 15, which connect said passages with the chamber 6.

As regards the foregoing features the impact-engine illustrated in Figs. 1 to 6 and Fig. 10 of the drawings is of the general type heretofore patented to me by Letters Patent of the United States No. 662,763, dated November 27, 1900, said elements being substantially identical in function and as regards their general features in construction with the corresponding elements of said patented engine.

The admission-ports 12 and 13 and the exhaust-ports 14 and 15 may be controlled by separate valves 16 and 17, respectively, (see Fig. 2 of the drawings,) adapted to be operated to open and close the ports which they respectively control primarily by movement of the piston-rod or plunger 8 relatively to the casing 1 in substantially the same manner as in the engine shown and described in said Letters Patent No. 662,763.

As an improvement over said construction I prefer to control both the admission-ports 12 and 13 and the exhaust-ports 14 and 15 by means of a single valve 18, Figs. 1 and 10, which extends through the wall or partition 3 and into desired relation to said admission and exhaust ports.

The exterior of the portion of the valve 18 which plays through the wall 3 is cylindrical, and the opening in said wall is provided with a suitable packing adapted to prevent leakage from the chamber 5 to the chamber 6. As shown, said opening is closed by means of a cup-leather packing 19, which closely embraces the cylindrical surface of said valve 18 at all times. As shown, said valve is provided with ports or openings 20 21 and 22 23, of which the ports or openings 20 and 21 are respectively adapted to be brought into communication with the ports or openings 12 and 13, and the ports or openings 22 and 23 with the ports or openings 14 and 15 by movement of said valve 18 lengthwise of said piston-rod or plunger 8.

The valve 18 is operated primarily in the same manner as the valves 16 and 17 by striking against the ends of the valve-chambers 5 and 6 as the piston-rod or plunger reciprocates. The advantage of this construction is that there is much less liability of the valve getting out of adjustment than where separate valves are used, as each valve tends to correct the adjustment of the other. It is obvious that the same advantages would be secured by rigidly connecting the valves 16 and 17, Fig. 2, as are obtained by using a single valve with two sets of ports.

I have found in practice that where the momentum of the moving parts of the engine is less than the resistance to their movement the stroke of the piston-rod or plunger gradually becomes shorter, thus correspondingly reducing the movement of the controlling valve or valves and the size of the admission-openings until the engine finally stops.

To insure that the engine-ports will be fully opened at each stroke of the engine, I have provided what may be termed a "secondary" valve-actuating mechanism, which just as the ports are about to open is adapted to move the valve or valves to fully open said ports.

In its preferable form my secondary valve-actuating device is as follows, particular reference being had to Figs. 1, 3, 4, 5, and 6:

Secured in the piston-rod or plunger 8 is a pin or stud 24, which projects into a groove or slot 25, formed longitudinally in the valve 18. In order to strengthen and stiffen the valve 18, the slot 25 is preferably bridged by a raised metal plate 26, formed integral with the body of said valve.

The lateral surfaces of the pin or stud 24 are inclined relatively to the direction of travel of said valve, said stud being preferably square and the corners thereof sharp.

Mounted in suitable guides or ways formed in the valve 18 on opposite sides of the groove or slot 25 are slides 27, the adjacent ends of which are tapered or pointed, forming inclined surfaces which also preferably meet and form a sharp edge or angle in the same manner as the inclined sides of the pin or stud 24. Applied to said slides 27 is a spring or springs adapted to force them inwardly toward each other, said spring or springs being sufficiently strong that when the points of the slides 27 engage the inclined surfaces of the pin or stud 24 they will move said valve, provided it is free to move. As shown, said slides are forced inwardly toward each other by a band-spring 28, the ends of which are applied to the outer ends of said slides and the intermediate portion forming a loop which passes around the valve, the ends of said spring being hooked over said slides. To prevent displacement of the spring 28, notches are provided in the ends of the slides 27 to receive the ends of said spring, and formed on the valve are lugs or projections 29, which embrace said spring at about its middle.

The dimension of the pin 24 lengthwise of the valve is two times the corresponding dimension of the full valve-opening, and the relation and adjustment of parts is such that just before the piston 9 reaches either end of its stroke the valve 18, having previously come into contact with rigid portions of the valve-casing 1, will be moved into the position shown in Fig. 3, which in both admission-ports and both exhaust-ports are fully closed, the adjacent sides of the ports in the valve and in the piston-rod or plunger being in line so that movement in either direction will open the admission-port to one and the exhaust-port to the other of the passages in said piston-rod or plunger.

When the slides 27 are in the positions relative to the pin or stud 24, (shown in Figs. 3 and 4,) the valve may be described as being in unstable equilibrium, as very slight movement of the valve in either direction will cause said slides 27 to engage one set or the other of inclined surfaces thereon and will operate to move it lengthwise of the piston-rod or plunger 8 a distance equal to one-half of the longitudinal dimension of the pin or stud 24 and full operative opening of one admission-port and the opposite exhaust-port. The expansion of the fluid in the cylinder and the momentum of the moving parts will always be sufficient to carry the pin or stud past its inoperative or dead-point and the secondary valve-operating mechanism rendered operative. With this construction it is therefore obvious that the admission and exhaust ports will be fully opened at each stroke of the piston and that it will be practically impossible for the valve to remain at its dead-point. Thus the valve will always be set, so that the engine will start whenever fluid under pressure is admitted to the chamber 5.

In order to prevent disengagement of the pin or stud 24 with the slot or groove 25, stops are provided which limit the movement of the valve relatively to the piston-rod or plunger 8. As shown, said stops are formed by the downwardly-extending ends 30 of a plate 31, which project into the path of travel of said pin or stud 24, the lengths of the valve-ports 20 21 and 22 23 being such that one set or the other of admission and exhaust ports will be fully open in all positions of the valve after being fully set by the secondary valve-operating mechanism, and the other set fully closed.

In Fig. 2 of the drawings, in which the admission and exhaust ports are controlled by separate valves, both valves are provided with a secondary valve-operating mechanism of my invention, the same parts being designated by the same reference-numerals, as in Figs. 1, 3, 4, 5, and 6.

The construction shown in Fig. 1, in which both the admission and exhaust ports are controlled by the same valve, has an advantage over the construction shown in Fig. 2, in which two valves are used, as only one secondary valve-operating device is necessary.

While a secondary valve-operating mechanism of my invention is particularly adapted for use on impact-engines of the type described, it admits of a much broader application and may, in fact, be applied to almost any form of reciprocating valve.

In order to illustrate its broad application, I have in Figs. 7, 8, and 9 of the drawings shown a secondary valve mechanism of my invention applied to a common and well-known form of valve. Referring then, particularly, to Figs. 7, 8, and 9 of the drawings, 32 is the power-cylinder of any ordinary type of engine, as a steam-pump; 33 is a piston fitted thereto, 34 the piston-rod, 35 the steam or valve chest, and 36 the valve which controls the cylinder-ports.

The valve 36 is of the piston-valve type, being cylindrical and fitted to and longitudinally movable in a suitable bore formed in the steam or valve chest 35.

The primary valve-operating mechanism is as follows: Fitted to and longitudinally movable in suitable bearings in the ends of the valve-chest 35 is a valve stem or rod 37, which passes freely through a longitudinal opening 38 in the valve 36. Reciprocating movement is imparted to the valve-stem 37 from the piston-rod 34 by means of a lever 39, the ends of which are pivotally connected to the piston-rod and valve-stem and which is pivoted between its ends to a link 40, the opposite end of which is pivoted to the cylinder-head. Formed on the valve-stem 37 are shoulders 41, adapted to strike the ends of the valve 36 as the valve-stem 37 moves in opposite directions.

The secondary valve-operating mechanism is as follows: The valve 36 is cut away between its ends, as shown at 42, and formed thereon is a flange 43, the sides of which are inclined and preferably meet in a sharp point, the longitudinal dimension of said flange at its base being two times the length of the desired valve-opening.

Fitted to and longitudinally movable in holes or openings 44, formed in bosses or projections 45 on the valve-chest, are slides 46, the inner ends of which taper to a point in substantially the same manner as the flange 43 is tapered.

Springs 47, inserted between the outer ends of the slides 46 and plugs 48, threaded into the openings 44, operate to force said slides 46 inwardly and are of such strength that under their influence the slides, pressing upon an inclined surface of the flange 43, will move the valve 36 in one direction or the other independently of the primary valve-operating mechanism. Shoulders 49 in the valve-chest prevent overthrow of the valve 36, from any cause.

The relation and adjustment of parts are such that the valve 36 will be moved by the primary valve-operating mechanism until the apex of the flange 43 has passed the points of the slides 46, which will be just at the time the piston 33 reaches the end of its stroke in either direction. The relation and adjustment of parts are such also that both cylinder-ports will be closed when the valve has been moved to the point indicated. As soon as the apex of the flange 43 has passed the points of the slides 46 said slides will operate to throw the valve 36, so as to open the proper admission and exhaust ports to the cylinder.

The inclined surfaces of the pin or stud 24 or of the flange 43 and of the slides 27 and 46 form, in effect, cam-surfaces, and while I prefer to use straight surfaces it is obvious that they admit of wide modification and variation without departing from my invention. For example, they may be curved in almost any desired manner.

I claim—

1. In an engine, the combination with a valve, of a primary valve-operating mechanism adapted to impart movement to said valve through a portion of its travel, and a secondary valve-operating mechanism located within the valve-chamber adapted to supplement the primary valve-operating mechanism, said valve being movable under the influence of said secondary valve mechanism independently of its primary operating connections, substantially as described.

2. In an engine, the combination with a valve, of a primary valve-operating mechanism adapted to impart movement to said valve through a portion of its travel, and a secondary valve-operating mechanism located within the valve-chamber and applied directly to said valve adapted to supplement the primary valve-operating mechanism, said valve being movable under the influence of said secondary valve-operating mechanism independently of its primary operating connections, substantially as described.

3. In an engine, the combination with a valve, of a primary valve-operating mechanism adapted to impart movement to said valve through a portion of its travel, and a secondary valve-operating mechanism adapted to supplement the primary valve-operating mechanism comprising cams on said valve and on a rigid support within the valve-casing, the cams on one thereof being formed on a yieldingly-supported slide or slides, said valve being movable under the influence of said secondary valve-operating mechanism independently of its primary operating connections, substantially as described.

4. In an engine, the combination with a valve, a rod which extends through an opening in said valve, connection between said rod and the engine-piston, a stud or pin which projects laterally from said rod on which are formed cam-surfaces, a slide or slides fitted to and longitudinally movable in guides or ways in said valve, cam-surfaces thereon which project into the path of travel of the cam-surfaces on said stud and a spring or springs applied to said slide or slides, substantially as described.

5. In an engine, the combination with a valve, a rod which extends through said valve, connection between said rod and the engine-piston, a stud or pin which projects from said rod on which are formed cam-surfaces, a slide or slides fitted to and longitudinally movable in guides or ways in said valve, cam-surfaces thereon which project into the path of travel of the cams on said stud, a spring or springs applied to said slide or slides and means to limit the relative movement of said valve and rod, substantially as described.

6. In an engine, the combination with a valve, a rod which extends through said valve, connection between said rod and the engine-piston, a stud or pin which projects laterally from said rod on which are formed cam-surfaces, a slide or slides fitted to and longitudinally movable in guides or ways in said valve, cam-surfaces thereon which project into the path of travel of the cam-surfaces on said stud, a spring or springs applied to said slide or slides and stops which limit the relative movement of said valve and rod, substantially as described.

7. In an engine, comprising a casing provided with a cylinder and a valve-chamber in line with each other, a piston, a piston-rod or plunger secured in said piston and passing through said valve-chamber, said piston-rod or plunger being provided with passage-ways which connect said valve-chamber with said cylinder, and a valve in said valve-chamber which surrounds and is movable with said piston-rod or plunger, of cam-surfaces formed on said piston-rod or plunger, a slide or slides fitted to and longitudinally movable in guides or ways in said valve, cam-surfaces thereon which project into the path of travel of the cam-surfaces on said piston-rod or plunger and a spring or springs applied to said slide or slides, substantially as described.

8. In an engine, comprising a casing provided with a power-cylinder and a valve-chamber in line with each other, a piston, a piston-rod or plunger secured in said piston which passes through said valve-chamber and is provided with passage-ways which connect said valve-chamber with the power-cylinder and a valve in said valve-chamber which surrounds said piston-rod or plunger and is movable therewith, of a stud or pin which projects from said piston-rod or plunger on which are formed cam-surfaces, a slide or slides fitted to and longitudinally movable in guides or ways in said valve, cam-surfaces thereon which project into the path of travel of the cam-surfaces on said stud and a spring or springs applied to said slide or slides, substantially as described.

9. In an engine, comprising a casing provided with a power-cylinder and a valve-chamber in line with each other, a piston, a piston-rod or plunger secured to said piston which passes through said valve-chamber and is provided with passage-ways which connect said valve-chamber with the power-cylinder and a valve in said valve-chamber which surrounds and is movable with said piston-rod or plunger, of a stud or pin which projects from said piston-rod or plunger provided with cam-surfaces, a slide or slides fitted to and longitudinally movable in guides or ways in said valve, cam-surfaces thereon which project into the path of travel of the cam-surfaces on said stud, a spring or springs applied to said slide or slides and means to limit the relative movement of said valve and piston-rod, substantially as described.

10. In an engine, comprising a casing provided with a power-cylinder and a valve-chamber in line with each other, a piston, a piston-rod or plunger secured to said piston which passes through said valve-chamber and is provided with passage-ways which connect said valve-chamber with the power-cylinder and a valve in said valve-chamber which surrounds and is movable with said piston-rod or plunger, of a stud or pin in said piston-rod or plunger, cam-surfaces formed thereon, a slide or slides fitted to and longitudinally movable in guides or ways in said valve, cam-surfaces thereon which project into the path of travel of the cam-surfaces on said stud, a spring or springs applied to said slide or slides and steps which limit the relative movement of said valve and rod, substantially as described.

11. In an engine, comprising a casing provided with a power-cylinder and a valve-chamber in line with each other, a piston, a piston-rod or plunger secured to said piston which passes through said valve-chamber and is provided with passage-ways which connect said valve-chamber with the power-cylinder and a valve in said valve-chamber which surrounds said piston-rod or plunger and is movable therewith, of a stud or pin which projects from said piston-rod or plunger, cam-surfaces thereon, a slide or slides fitted to and longitudinally movable in guides or ways in said valve, cam-surfaces thereon which project into the path of travel of the cam-surfaces on said stud, a spring or springs applied to said slide or slides and rigid projections on said valve in line with the stud on the piston-rod or plunger, substantially as described.

12. In an engine, comprising a casing provided with a power-cylinder and a valve-chamber in line with each other, a piston and a piston-rod or plunger secured to said piston which passes through said valve-chamber and is provided with passage-ways which connect said valve-chamber with the power-cylinder, of a valve in said valve-chamber which surrounds and is movable with said piston-rod or plunger and is provided with a longitudinal slot or groove, a stud or pin which projects from said piston rod or plunger and engages the groove or slot in said valve, cam-surfaces on said pin or stud, a slide or slides fitted to and longitudinally movable in guides or ways in said valve, cam-surfaces thereon which project into the path of travel of the cam-surfaces on said stud, a spring or springs applied to said slide or slides and stops which limit the relative movement of said valve and piston-rod or plunger, substantially as described.

13. In an engine, comprising a casing provided with a power-cylinder and a valve-chamber in line with each other, a piston, a piston-rod or plunger secured to said piston which extends through said valve-chamber and is provided with passage-ways which connect said valve-chamber with said power-cylinder, and a valve in said valve-chamber which surrounds and is movable with said piston-rod or plunger, of straight cam-surfaces on said piston-rod or plunger which meet forming a sharp angle, a slide or slides fitted to and longitudinally movable in guides or ways in said valve, straight cam-surfaces thereon which meet forming a sharp angle and which project into the path of travel of the cam-surfaces on said stud and a spring or springs applied to said slide or slides, substantially as described.

14. In an engine, comprising a casing provided with a power-cylinder and a valve-chamber in line with each other, a piston-rod or plunger secured to said piston which extends through said valve-chamber and is provided with passage-ways which connect said valve-chamber and said power-cylinder, of a valve in said valve-chamber which surrounds and is movable with said piston-rod or plunger and is provided with a longitudinal groove or slot, a square stud in said piston-rod which engages the groove or slot in said valve, the sides of said stud being inclined at equal angles to the sides of said piston-rod or plunger, a slide or slides which are fitted to and are longitudinally movable in guides or ways in said valve the ends of which are angular and project into the path of travel of said stud and a spring or springs applied to said slide or slides, substantially as described.

15. In an engine, comprising a casing provided with a power-cylinder and a valve-chamber in line with each other, a piston and a piston-rod or plunger secured to said piston which extends through said valve-chamber and is provided with passage-ways which connect said valve-chamber with said power-cylinder, of a valve in said valve-chamber which surrounds and is movable with said piston-rod or plunger and is provided with a longitudinal groove or slot, a square stud in said piston-rod or plunger which engages the groove or slot in said valve, the sides of said stud being inclined at equal angles to the sides of said piston-rod or plunger, a slide or slides fitted to and longitudinally movable in guides or ways in said valve the ends of which are angular and project into the path of travel of the stud in said piston-rod or plunger, a spring or springs applied to said slide or slides and stops which limit the relative movement of said valve and piston-rod or plunger, substantially as described.

16. In an engine, comprising a casing in which are formed a power-cylinder and separate valve-chambers all in line with each other, a piston and a piston-rod or plunger secured to said piston which extends through said valve-chambers and is provided with passage-ways which connect said power-cylinder with said valve-chambers, a valve which surrounds and is movable with said piston-rod and extends through the wall separating said valve-chambers and into proper relation to the ports to the passage-ways in said piston-rod or plunger, the distance between opposite ends of said valve-chambers being greater than the length of said valve by an amount substantially equal to the travel of said piston-rod or plunger, cam-surfaces on said piston-rod or plunger, a slide or slides fitted to and longitudinally movable in guides or ways in said valve, cam-surfaces thereon which project into the path of travel of the cam-surfaces on said piston-rod or plunger and a spring or springs applied to said slide or slides, substantially as described.

17. In an engine, comprising a casing in which are formed a power-cylinder and separate valve-chambers in line with each other, a piston and a piston-rod secured therein which extends through said valve-chambers and is provided with passage-ways which connect said power-cylinder with said valve-chambers, a valve which surrounds said piston-rod or plunger and is movable therewith and which extends into both valve-chambers and into proper relation to the ports to the passage-ways in said piston-rod or plunger, the distance between opposite ends of said valve-chambers being greater than the length of said valve by an amount substantially equal to the travel of said piston-rod, cam-surfaces on said piston-rod or plunger, a slide or slides fitted to and longitudinally movable in guides or ways in said valve, cam-surfaces thereon which project into the path of travel of the cam-surfaces on said piston-rod or plunger, a spring or springs applied to said slide or slides and stops adapted to limit the relative movement of said valve and piston-rod or plunger, substantially as described.

18. In an engine, comprising a casing provided with a power-cylinder and separate valve-chambers all in line with each other, a piston and a piston-rod or plunger secured in said piston which extends through said valve-chambers and is provided with passage-ways which connect said valve-chambers with said power-cylinder, of a valve which surrounds said piston-rod or plunger and is movable therewith and which extends into both valve-chambers, the length of said valve being such that when the piston-rod is moving in either direction, the end of the valve will strike the end of the valve-chamber toward which it is moving, before said piston-rod reaches the limit of its movement, substantially as described.

19. In an engine, comprising a casing provided with a power-cylinder and separate valve-chambers in line with each other, a piston and a piston-rod secured thereto which extends through said valve-chambers and is provided with passage-ways which connect said power-cylinder with said valve-chambers, of a valve which surrounds said piston-rod or plunger and is movable therewith and which extends into both valve-chambers, the length of said valve being such that when the piston-rod is moving in either direction, the valve moving with said piston-rod will come into contact with the end of the valve-chamber toward which it is moving before the piston-rod reaches the limit of its movement and stops which limit the relative movement of said piston-rod and valve, substantially as described.

20. A valve-operating mechanism comprising cams on said valve and on a part relatively to which said valve is movable, a slide or slides fitted to and longitudinally movable in guides or ways in one thereof on which one of said cams is formed, a spring or springs applied to said slide or slides and means to impart relative movement to said valve and other cam support, substantially as described.

In testimony that I claim the foregoing as my invention I affix my signature, in presence of two subscribing witnesses, this 22d day of November, A. D. 1901.

BYRON B. CARTER.

Witnesses:
JOHN A. McKEOWN,
ARTHUR W. UNDERWOOD.